(12) United States Patent
Tan (10) Patent No.: US 9,143,724 B2
(45) Date of Patent: Sep. 22, 2015

(54) TELEPRESENCE PORTAL SYSTEM

(75) Inventor: Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 14/123,350

(22) PCT Filed: Jul. 6, 2011

(86) PCT No.: PCT/US2011/043106
§ 371 (c)(1),
(2), (4) Date: Dec. 2, 2013

(87) PCT Pub. No.: WO2013/006170
PCT Pub. Date: Jan. 10, 2013

(65) Prior Publication Data
US 2014/0104368 A1      Apr. 17, 2014

(51) Int. Cl.
*H04N 7/14* (2006.01)
*H04N 7/15* (2006.01)
*H04N 9/31* (2006.01)

(52) U.S. Cl.
CPC .............. *H04N 7/144* (2013.01); *H04N 7/147* (2013.01); *H04N 7/15* (2013.01); *H04N 9/3147* (2013.01)

(58) Field of Classification Search
CPC ....................................................... H04N 7/14
USPC ................... 348/14.01, 14.07, 14.15, 14.16
See application file for complete search history.

(56) References Cited

U.S. PATENT DOCUMENTS

| 7,119,829 B2 | 10/2006 | Leonard et al. |
| 7,515,174 B1 | 4/2009 | Francisco et al. |
| 2006/0181607 A1 | 8/2006 | McNelley |
| 2007/0171275 A1* | 7/2007 | Kenoyer .................... 348/14.08 |
| 2007/0190506 A1 | 8/2007 | Jeng et al. |
| 2008/0043100 A1 | 2/2008 | Sobel et al. |
| 2009/0231412 A1 | 9/2009 | Derocher et al. |
| 2009/0278913 A1* | 11/2009 | Rosenfeld et al. ......... 348/14.16 |
| 2010/0225735 A1* | 9/2010 | Shaffer et al. .............. 348/14.08 |
| 2010/0245535 A1* | 9/2010 | Mauchly .................... 348/14.08 |

(Continued)

FOREIGN PATENT DOCUMENTS

| TW | I341692 | 5/2011 |
| WO | WO-2010130084 A1 | 11/2010 |

OTHER PUBLICATIONS

PCT: "Notification of Transmittal of the International Search Report and the Written Opinion of the International Searching Authority; or the Declaration"; PCT/US2011/043106; mailed Feb. 28, 2012; 8 pages.

*Primary Examiner* — Olisa Anwah
(74) *Attorney, Agent, or Firm* — HP Legal Department (57) ABSTRACT

Embodiments of the present invention disclose a telepresence portal system. According to one embodiment, the telepresence portal system includes a host portal having a plurality of host transparent displays arranged to face different sides of a host user. Furthermore, each host transparent display is associated with an image capturing device for capturing different viewpoint images of the host user. A remote portal is in communication with the host portal and includes a plurality of remote transparent displays arranged to correspond with the positions of the host transparent displays. In addition, each remote transparent display renders a viewpoint image of the host user on the corresponding remote transparent display for view by at least one remote user.

15 Claims, 8 Drawing Sheets

(56) References Cited

U.S. PATENT DOCUMENTS

2011/0096136 A1* 4/2011 Liu et al. .................... 348/14.07
2013/0100240 A1   4/2013 Liu et al.

\* cited by examiner

TELEPRESENCE PORTAL SYSTEM

BACKGROUND

Today's video conferencing systems provide an interactive and effective means for remote users to participate in a virtual event such as a meeting, lecture, or even a concert performance. Such systems typically involve the simultaneous and real-time transmission of audio and video streams that are associated with participating or active users. Some video conference systems provide an immersive video environment for one-to-one communication between active participants in a dedicated or closed-room setting. When there are multiple people involved in a live meeting within a room or outdoor event using a single flat-panel display (or vertically-arranged displays), the remote participants may only see a general wide-angle view of the meeting area and host participant. In many circumstances, a single wide-angle view fails to provide enough perspective or facial detail of the meeting participants in order to have their expressions and/or body language effectively communicated to the remote meeting participants.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a three-dimensional perspective view of a host portal site, while

FIG. 3A is three-dimensional perspective view of another host portal site, while

FIGS. 4A and 4C are three-dimensional perspective views of a host portal site, while FIGS. 4B and 4C are three-dimensional perspective views of a remote portal site implementing a multi-layered telepresence portal system according to an example of the present invention.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Prior multi-view videoconferencing solutions utilize a single display to deliver multiple perspective views, usually at the cost of spatial resolution. However, multi-view displays often exhibit crosstalk, or signal disturbance in separate circuits or channels, which serves to degrade the display quality and prevents the delivery of highly-realistic video images. In addition, these prior solutions do not allow for capture and display of views involving a large change in viewing angles (e.g., front and profile views at 90 degrees).

Examples of the present invention provide a telepresence portal system configured to capture and display meeting participants from various viewing positions. More particularly, a host portal site and remote portal site include displays, cameras, and projectors for displaying, capturing and projecting images of meeting participants. Since multiple viewing angles of a host/remote participant are captured, accurate gaze direction is correctly conveyed to audiences and users viewing the portal at various angles.

Figure 1:
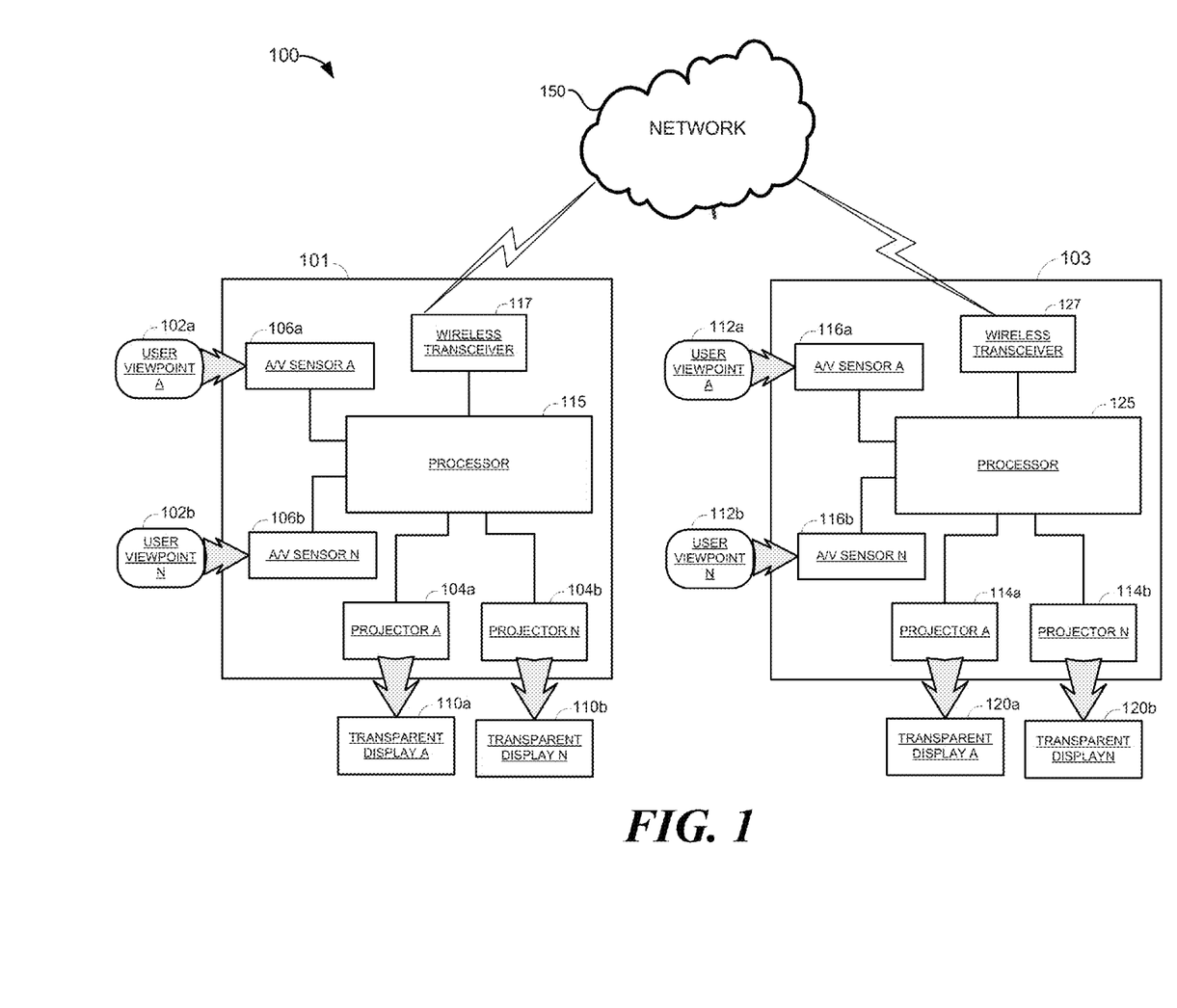
FIG. 1 is a simplified block diagram of a multi-view telepresence portal system according to an example of the present invention.

Referring now in more detail to the drawings in which like numerals identify corresponding parts throughout the views. FIG. 1 is a simplified block diagram of a multi-view telepresence portal system according to an example of the present invention. As shown in this example embodiment, the multi-view telepresence portal system 100 includes a host portal site 101 and a remote portal site 103 connected via a network or internetwork server 150. The host portal site 101 includes a processor 115 coupled to audio/video (A/V) sensors 106*a* and 106*b*, a wireless transceiver 117, and image projectors 104*a* and 104*b*. A/V sensors 106*a* and 106*b* are configured to capture audio and viewpoint images 102*a* and 102*b* associated with a perspective view of a local or host participant(s) and convert the optical images into an electronic signal to be read by the processor 115. The A/V sensors 106*a* and 106*b* may include a video camera or similar video capture device. Alternatively, the audio and video sensors may be incorporated on separate devices rather than a single device. Image projectors 104*a* and 104*b* are configure to project images onto associated displays 110*a* and 110*b*. According to one example, displays 110*a* and 110*b* include transparent or semi-transparent contacts on both sides of the device so that light may emit from and/or projected onto either side of the display such as a transparent organic light emitting diode (OLEO) display, or the like. In one embodiment, the network interface controller 117 includes electronics and circuitry necessary to communicate (i.e., send and receive video/audio data) with the network server 150 through computer networking technology standards such as Ethernet, Wi-Fi, or Token Ring for example. Processor 115 represents a central processing (CPU), microcontroller, microprocessor, or logic configured to execute programming instructions associated with the host portal site 101. According to one example, network server 150 represents an internetworked computing system configured to receive and transmit audio and video data to/from the host portal site 101 and the remote portal site 103.

Similarly, the remote portal site 103 includes a processor 125 coupled to A/V sensors 116a and 116b, a wireless transceiver 127, and image projectors 114a and 114b. As on the host site 101, processor 115 of the remote portal site 103 represents a central processing (CPU), microcontroller, microprocessor, or logic configured to execute programming instructions associated with the remote portal site 103. According to one example, network server 150 represents an internetworked computing system configured to receive and transmit audio and video data to/from the remote portal site 103 and the host portal site 101. Network interface controller 127 includes electronics and circuitry necessary to communicate (i.e., send and receive video/audio data) with the network server 150 through computer networking technology standards such as Ethernet, Wi-Fi, or Token Ring for example. A/V sensors 116a and 116b are configured to capture audio and viewpoint images 112a and 112b associated with a perspective view of a local or remote participant(s) and convert the optical images into an electronic signal to be read by the processor 125. Image projectors 114a and 114b are configured to project images onto associated displays 120a and 120b. Similar to the host portal 101, displays 120a and 120b of the remote portal 103 include transparent or semi-transparent contacts on both sides of the device so that light may emit from and/or projected onto either side of the display such as a transparent organic light emitting diode (OLED) display device, or the like.

Figure 2A:
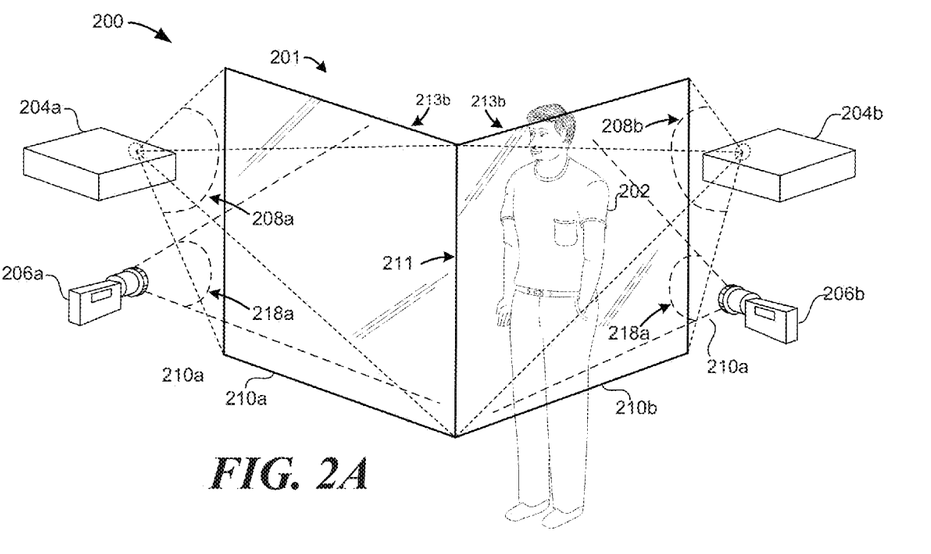

FIG. 2A is a three-dimensional perspective view of a host portal site, while FIG. 23 is a three-dimensional perspective view of a remote portal site utilizing multi-view telepresence portal system according to an example of the present invention. As shown in the example of FIG. 2A, the host portal site 200 includes projectors 204a and 204b, cameras 206a and 206b, and transparent displays 210a and 210b. Here, transparent displays 210a and 210b are arranged perpendicularly with respect to one another along a common edge 211. A local operating user 202 is positioned on an inner side 213a and 213b of each transparent display 210a and 210b respectively such that each display is facing a different viewpoint or viewing angle of the user (e.g., front profile view and side profile view). As shown in the present example, the transparent displays 210a and 210b have dimensions capable of displaying a substantially life-sized image of a meeting participant (e.g., images 202' and 202" shown in FIG. 2B). Furthermore, projectors 204a and 204b and cameras 206a and 206 are arranged on an opposite side of the inner side 213a and 213b of an associated transparent display 210a and 210b respectively so as to project images for viewing and to capture different perspective views of a meeting participant. More specifically, the projectors 204a and 204b are arranged to project viewpoint images of remote participants (i.e., remote portal user), while cameras 206a and 206b capture viewpoint images of a local participant (e.g., user 202) within a respective field of view 218a and 218b. Each projector 204a and 204h has a field of projection 208a and 208b associated with a particular transparent display (i.e., display 210a and 210b respectively).

Figure 2B:
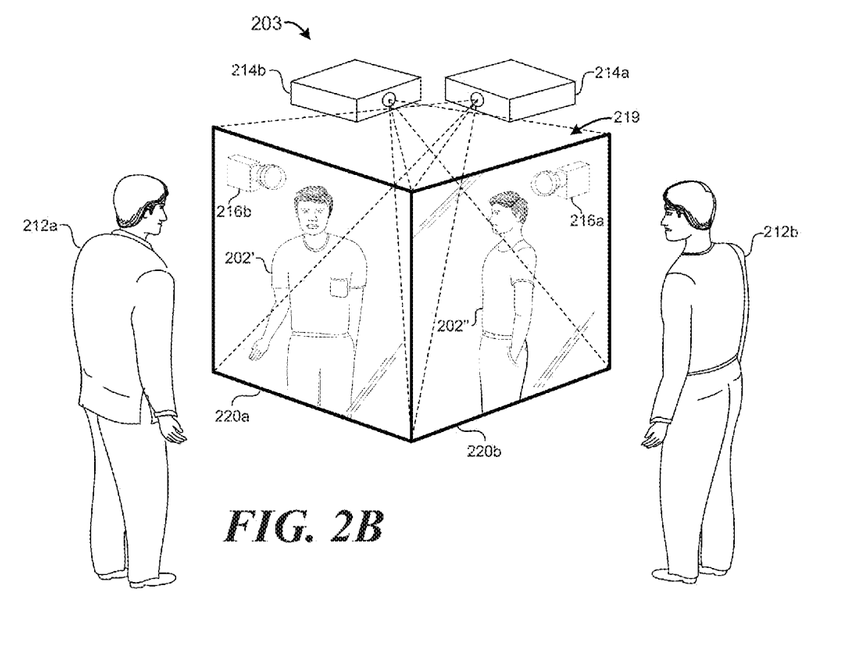
FIG. 2B is a three-dimensional perspective view of a remote portal site of a telepresence portal system according to an example of the present invention.

Referring now to FIG. 2B, the remote portal site 205 includes projectors 214a and 214b, cameras 216a and 216b, and transparent displays 220a and 220b. As in the previous example, transparent displays 220a and 220b are arranged perpendicularly with respect to one another along a common edge 211. Remote meeting participants 212a and 212b are positioned on an opposite side of the each display 220a and 220b than the host user 202 shown in FIG. 2A (i.e., opposite of inner side 213a and 213b). Projectors 214a and 214 may be positioned on an inner side area 219 formed by a combination of the two transparent displays 220a and 220b. Here, the projectors 214a and 214b are configured to project respective viewpoint images of the host user (i.e., images associated with image sensors 206a and 206b shown in FIG. 2A). In the present example, projector 214a projects a front profile view 202' of user 202 onto transparent display 220a, while projector 214b projects a side profile view 202" of user 202 onto transparent display 220b. Furthermore, image sensors 216a and 216b are configured to capture images of users (e.g., remote participants 212a and 212b) within a field of view and in proximity to displays 220a and 220b respectively for transmission (via the processor and network interface) back to the host portal site 201. Moreover, in the case of video crosstalk in which the content displayed for viewing by a local participant is unintentionally captured by the local camera and delivered to the remote participant, any visual crosstalk reduction technique may be employed in the present system to ensure that the subject camera captures a clear view of the target scene without capturing the displayed content.

Figure 3A:
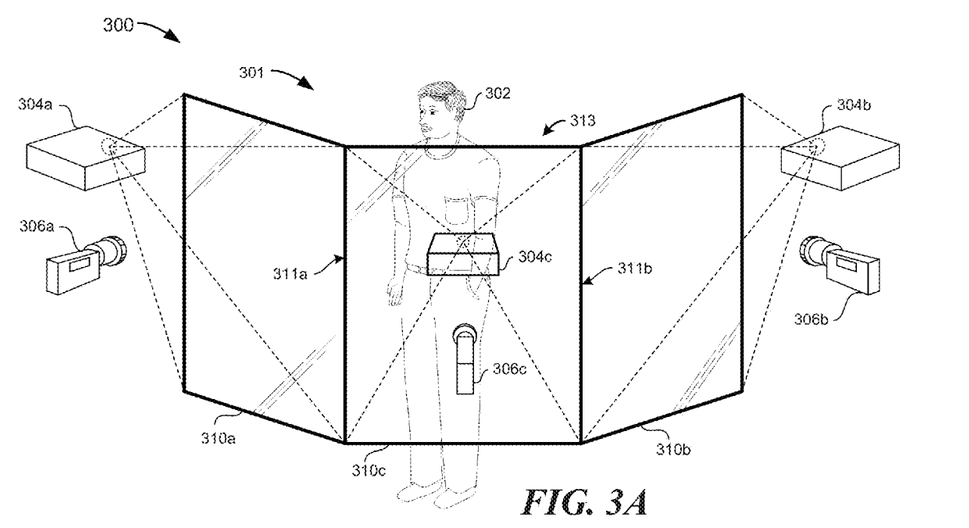
Figure 3B:
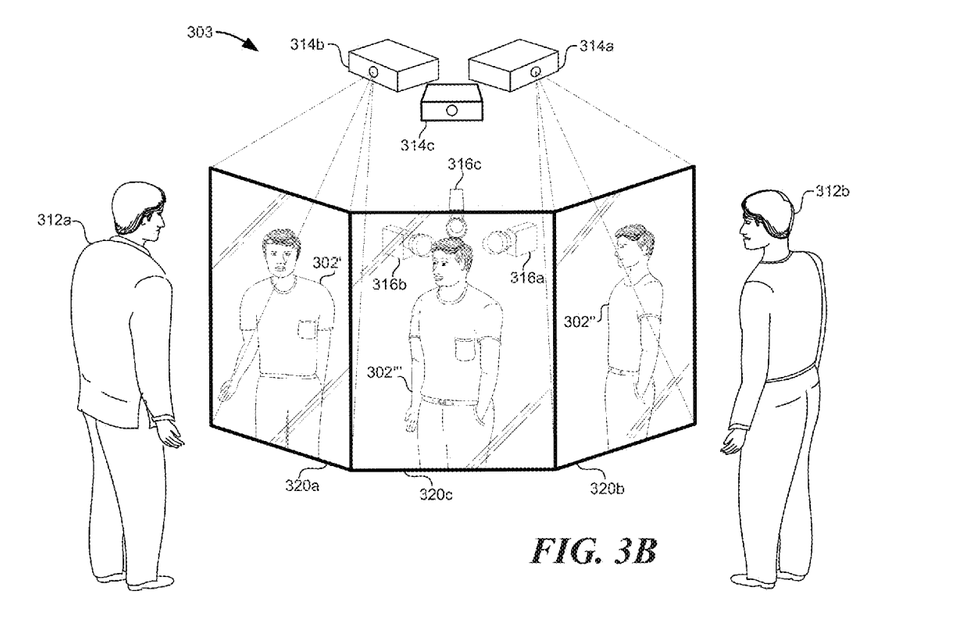
FIG. 3B is three-dimensional perspective view of another remote portal site of a telepresence portal system according to an example of the present invention.

FIG. 3A is three-dimensional perspective view of another host portal site, while FIG. 3B is three-dimensional perspective view of another remote portal site of the telepresence portal system according to an example of the present invention. As shown in FIG. 3A, the host portal site 301 includes three imaging projectors 304a-304c, three imaging sensors 306a-306c, and three transparent displays 310a-310c. In the present example, the transparent displays 310a-310c are positioned adjacent to one another and may be interconnected via common edges 311a and 311b of the central display 310c so as form a closed-off area or angled wall. As in the previous example, a host participant 302 is positioned on an inner side 313 of each transparent display 310a-310c such that each display is facing and associated with a different viewpoint of the user (e.g., front profile view and side profile view). In one instance, projectors 304a-304c and cameras 306a-306c are arranged on an opposite side of the inner side 311 of the transparent displays 310a-310c so as to project images for viewing and to capture different perspective views of the host participant 302. However, examples of the present invention are not limited thereto as the projectors and cameras may be positioned at any location of the host portal site 301 so as to provide the aforementioned functionality. As shown here, projectors 304a-304c are arranged to correspond with a particular display 310a-310c respectively in order to project viewpoint images of remote participants (i.e., remote portal site users) thereon. Furthermore, each imaging sensor 306a-306c is arranged to correspond with a particular display 310a-310c respectively in order to capture various viewpoints and perspective images of a local participant (e.g., host user 302).

The example shown in FIG. 3B depicts a remote portal site 303 displaying viewpoint images (302', 302", and 302''') of the host user 302. Similar to the host portal site 301 described above, the remote portal site 303 includes three imaging projectors 314a-314c, three imaging sensors 316a-316c, and three transparent displays 320a-320c. As above, the transparent displays 320a-320c are positioned adjacent to one another and may be interconnected via common edges of the central display 320 so as form a closed-off area or angled wall. Here, the remote participants 312a and 312b are positioned on a side opposite the inner side of the transparent displays 320a-320c. The imaging projectors 314a-314c and imaging sensors 316a-316c are arranged on the inner side of the transparent displays 320a-320c so as to project and capture different perspective views of meeting participants. However, examples of the present invention are not limited thereto as the projectors and cameras may be positioned at any location of the remote portal site 303 so as to provide the aforementioned functionality. Each imaging sensor 316a-316c is arranged to correspond with a particular display 320a-320c respectively in order to capture various viewpoints and perspective images of the remote participant(s) 312a and 312b. As shown here, projectors 314a-314c are arranged to correspond with a particular display 320a-320c respectively in order to project viewpoint images of host user. In the present example, the imaging projector 314a associated with the left display 320a projects a front profile view or viewpoint image 302' of the host user 302, the imaging projector 314b associated with the right display 320b projects a side profile view or viewpoint image 302" of the host user 302, and the imaging projector 314c associated with the center display 320c projects a three-dimensional view or viewpoint image 302''' of the host user 302. Thus, the audience or remote participants 312a and 312b are provided a true telepresence experience in which the gaze direction and movement of the remote party are accurately simulated and visualized in real-time.

Figure 4A:
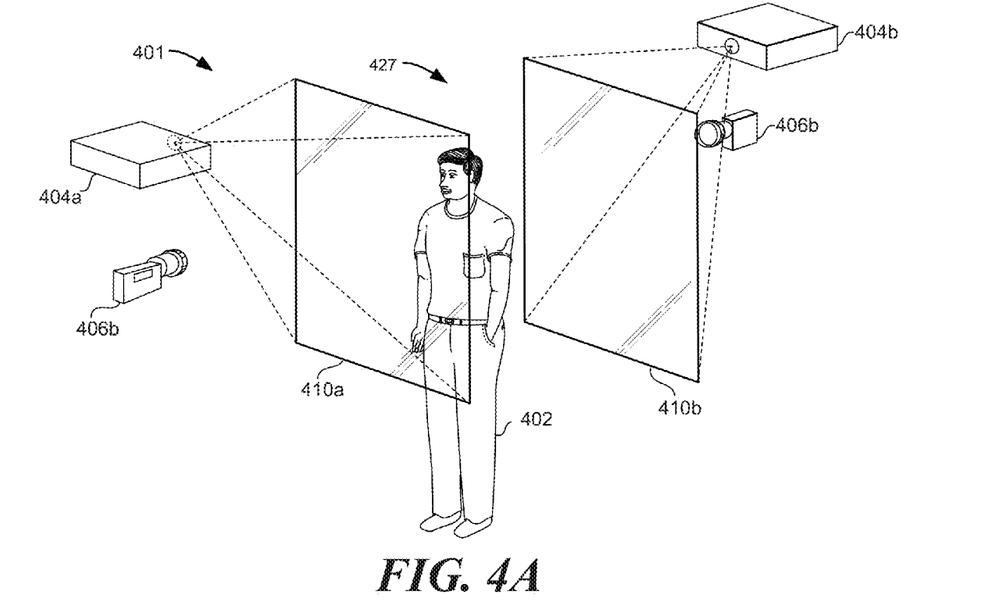
Figure 4B:
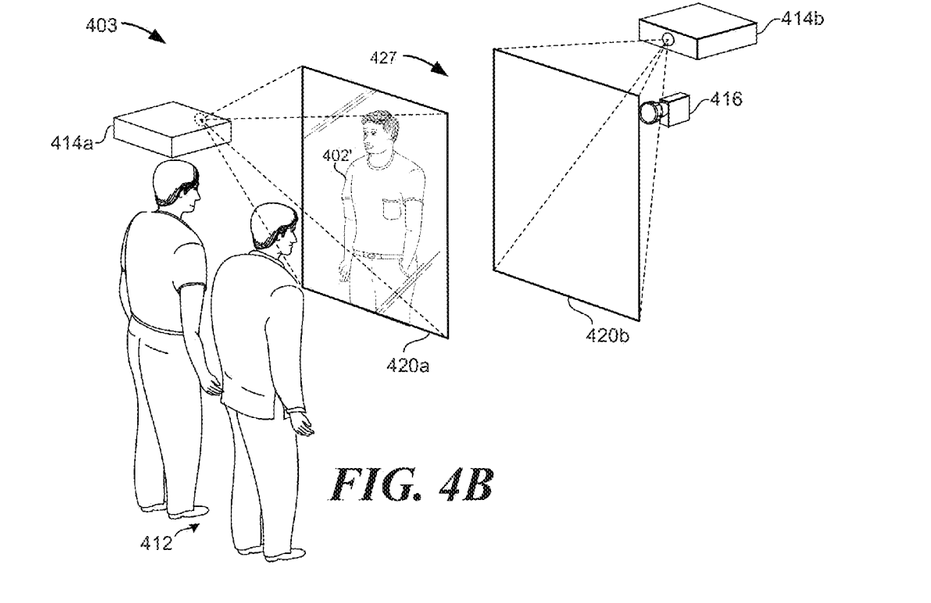
Figure 4C:
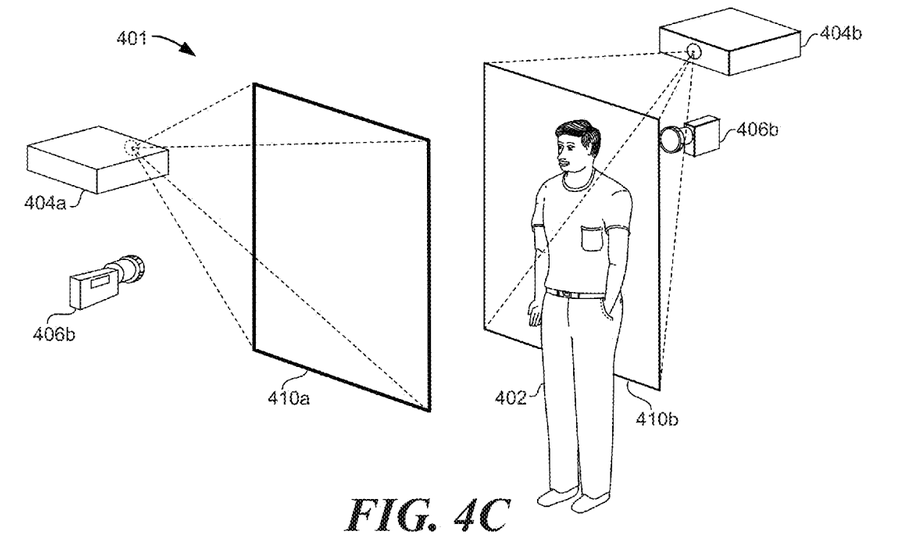
Figure 4D:
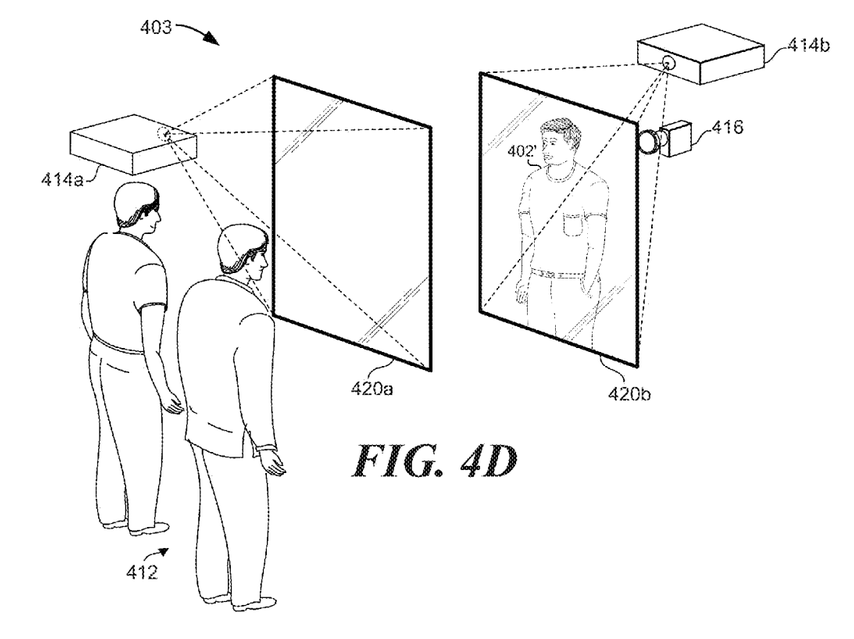

FIGS. 4A and 4C are three-dimensional perspective views of a host portal site, while FIGS. 4B and 4D are three-dimensional perspective views of a remote portal site implementing a multi-layered telepresence portal system according to an example of the present invention. As shown in FIG. 4A, the host portal site includes imaging projectors 404a and 404b, optical cameras 406a and 406b, and front and rear transparent displays 410a and 410b. In the present example, the front transparent display 410a is separated and arranged in parallel with respect to the rear transparent display 410b so as to form a gap area 427 between the two displays 410a and 410b. As shown here, an operating or host user 402 is positioned within the gap area 427 and closer to the front transparent display 410a than the rear transparent display 410b. Imaging projectors (front 404a and rear 404b) and cameras (front 406a and rear 406b) are arranged on an opposite side of each transparent display 410a and 410b respectively away from the gap area 427. In particular, the front projector 404a is configured to project viewpoint images on front display 410a while the rear projector 404b is configured to project viewpoint images on the rear display 410b. Similarly, front optical camera 406a is configured to capture front viewpoint images of a local participant (e.g., front image of host user 402), while rear optical camera 406b is configured to capture rear viewpoint images of the local meeting participant (e.g., rear image of host user 402).

FIG. 4B depicts the remote portal site implementing a multi-layered telepresence portal system. As in the host portal site 401 shown in FIG. 4A, the remote portal site 403 includes imaging projectors 414a and 414b, optical cameras 416a and 416b, and front and rear transparent displays 420a and 420b. In an effort to maintain uniformity between the portal sites, in the present example the front transparent display 420a is separated and arranged in parallel with respect the rear transparent display 420b so as to form a gap area 427 between the two displays 420a and 420b, and imaging projectors (front 414a and rear 414b) are arranged on an opposite side of each respective transparent display 420a and 420b. In particular, the front projector 414a is configured to project viewpoint images on front display 420a while the rear projector 414b is configured to project viewpoint images on the rear display 420b. According to one embodiment, optical camera 416 is configured to capture images of the remote participants for presentation at the host portal site 401. Here, remote participants 412 are positioned on a viewing side of the front transparent display 420a opposite the gap area 427. Based on the position of the local participant 402 near the front display 410a at the host portal site 401, the corresponding viewpoint image 402' of the user 402 is projected by the front projector 414a onto the front display 420a at the remote portal site 403.

In another example of the layered display set-up shown in FIG. 4C, the local or host user 402 at the host portal site 401 is now positioned closer to the rear transparent display 410b than the front transparent display 410a. In accordance therewith, image 402' of the user 402 is presented and projected at the remote portal site 403 onto the rear display 420b (via rear imaging projector 414b) as shown in FIG. 4D. Such a configuration gives the remote participants 412 a sense of spatial realism as visualization of local participant changes based on the physical location of the local participant at the host portal site 401.

Figure 5:
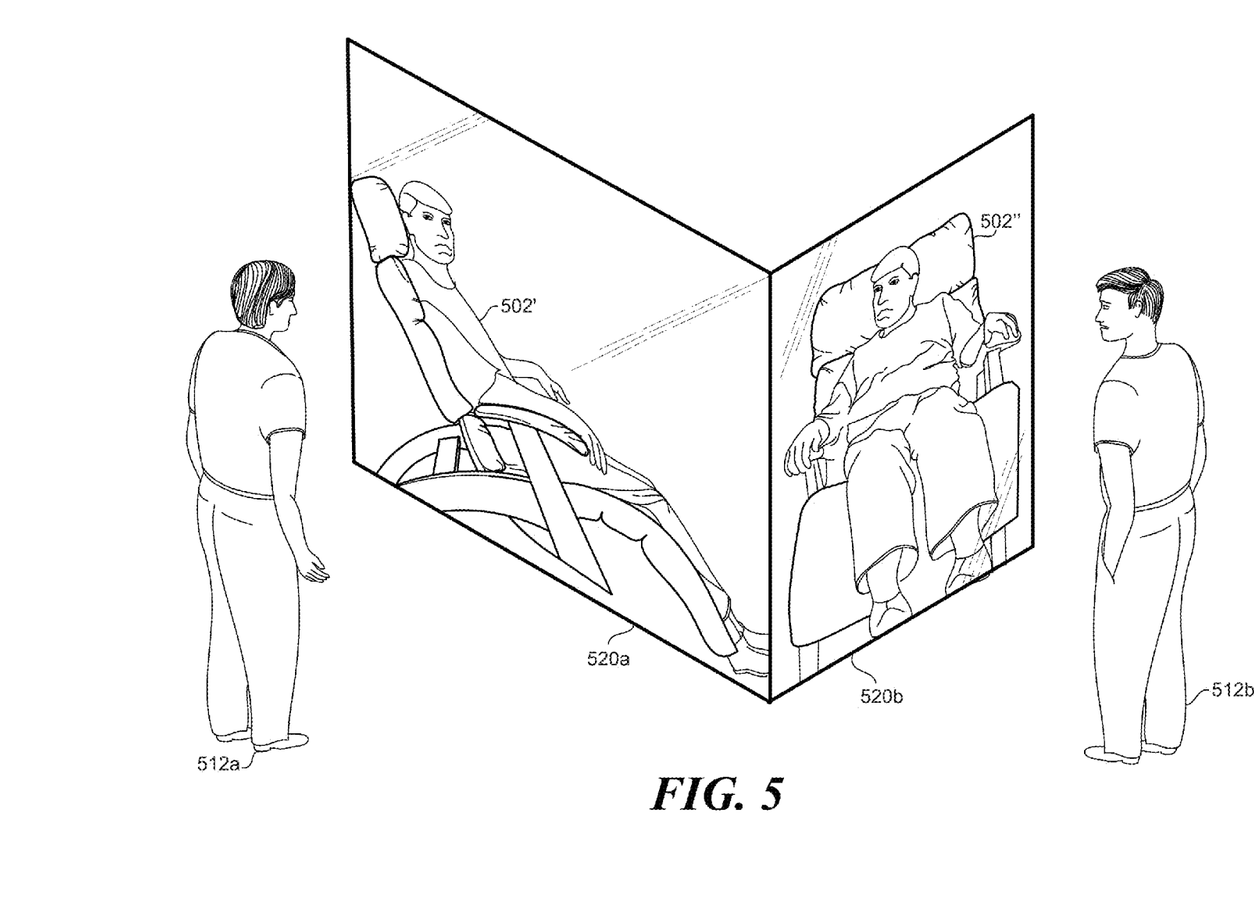
FIG. 5 is a three-dimensional perspective view of a remote portal site using a multi-view telepresence portal system according to an example of the present invention.

FIG. 5 is a three-dimensional perspective view of a remote portal site using a multi-view telepresence portal system according to an example of the present invention. The example of FIG. 5 depicts viewing users 512a and 512b of a remote portal site. As shown here, audience members 512a and 512b are viewing images 502' and 502" of a host user on transparent displays 520a and 520b respectively, More specifically, the present example depicts a realistic and accurate side profile viewpoint image 502' and front profile viewpoint image 502" of the host user. Based on the gaze direction of the host user, the viewing users 512a and 512b are able to correctly determine that the host user has turned his viewing direction to meeting participant 512a. As such, the meeting participants may then determine that the host user is speaking directly to remote user 512a or intends to elicit a response from remote user 512a.

Figure 6:
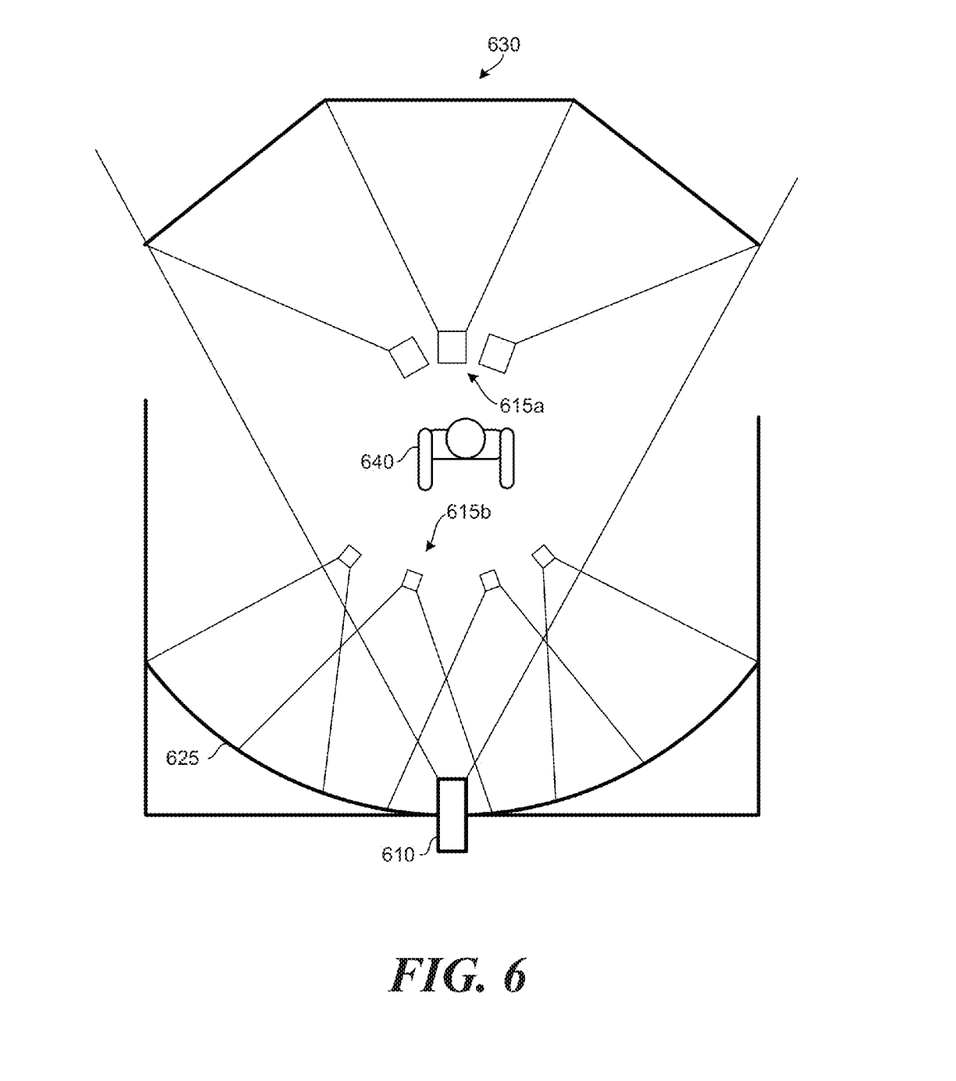
FIG. 6 is a top down view of a simplified configuration a multi-view and multi-layered telepresence portal system according to an example of the present invention.

FIG. 6 is a top down view of a simplified configuration of displays and cameras within a multi-view and multi-layered telepresence portal system according to an example of the present invention. As shown in this example, the portal system 600, which may be a host or remote portal site, includes a multitude of transparent displays 630 associated with a number of image projectors 615a, and a curved display 625 associated with a number of image projectors 615b. In addition, an optical camera 610 is positioned proximate to the curved display 625 for capturing images of a meeting participant 640. Depending on the physical location of the local/remote meeting participant(s), video images of remote user (s) may appear on either of displays 630 for providing perspective and viewpoints for better meeting interaction as described above or may appear on the wide-angled curved display 625. Accordingly, the present example is capable of providing both a multi-layered (i.e., display based on physical location of remote/local user) and multi-viewpoint (i.e., displaying multiple perspective views of the remote/local user) presentation, thus creating a truly immersive videoconferencing experience.

Figure 7A:
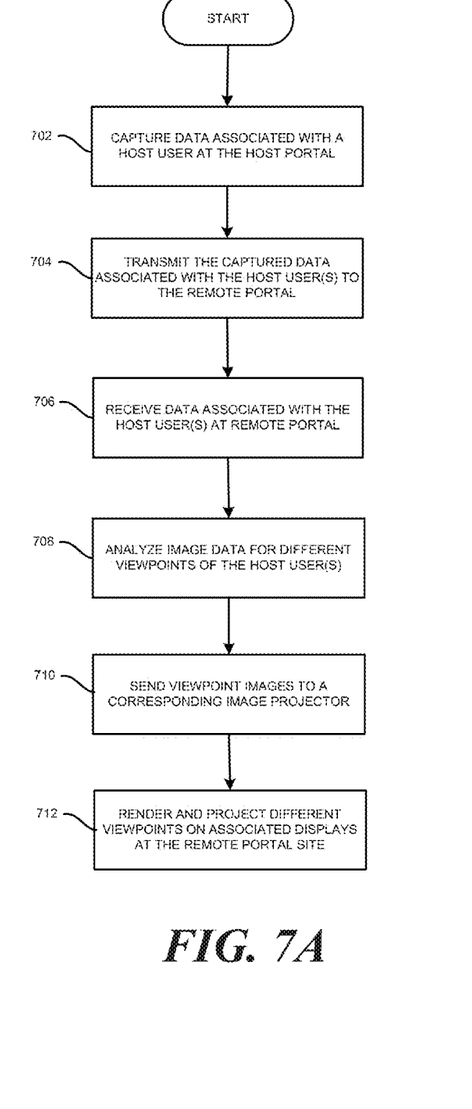
FIGS. 7A and 7B are simplified flow chart illustrating the processing steps of the telepresence portal system according to an example of the present invention.
Figure 7B:
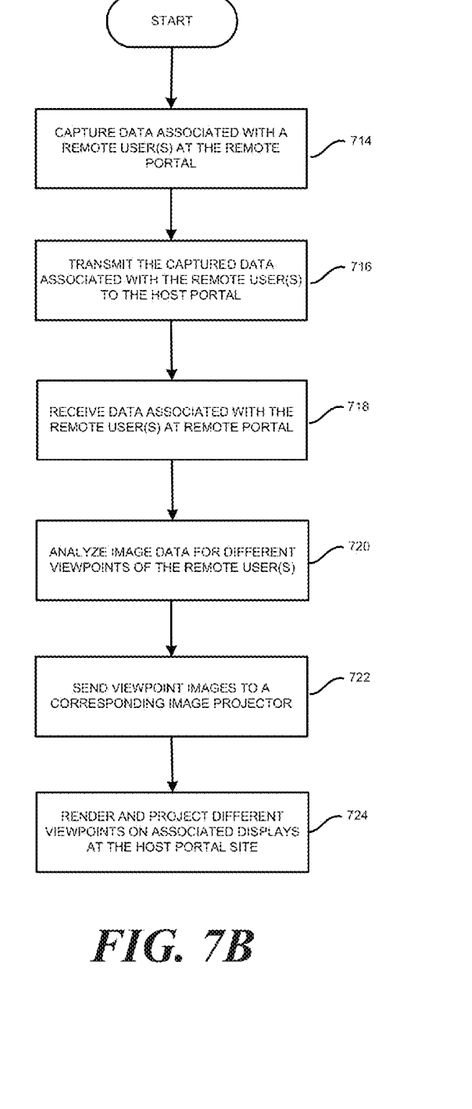

FIGS. 7A and 7B are simplified flow chart illustrating the processing steps of the telepresence portal system according to an example of the present invention. In step 702, image data associated with a host user or number of local users is captured by at least one optical sensor at the host portal site and sent to the processing unit. Next, in step 704, information associated with the captured images is transmitted from the host portal site to the remote portal site via the network server. Thereafter, image data associated with the host user(s) is received at the remote portal site in step 706. In step 708, the processing unit then analyzes the received data and determines different viewpoint images of the host user(s). Based on the analyzed image data, in step 710 different viewpoint images of the user(s) are sent to a corresponding image projector (e.g., side profile view to left projector, front profile view to right projector). The viewpoint images (i.e., video) are then rendered and projected by the image projectors onto an associated transparent display at the remote portal site in step 712.

Similarly, the processing steps of at the remote portal site are described in FIG. 7B. In step 714, image data associated with a remote user or number or remote users is captured at the remote portal site by at least one image sensor and sent to the processing unit. Next, in step 716, information associated with the captured images is transmitted from the remote portal site to the host portal site via the network server. Thereafter, image data associated with the host user is received at the host portal site in step 718. In step 720, the processing unit then analyzes the received data and determines different viewpoint images of the remote user(s). Based on the analyzed image data, in step 722 different viewpoint images of the user are sent to a corresponding image projector (e.g., side profile viewpoint image to left projector, front profile viewpoint image to right projector). The viewpoint images are then rendered and projected by the image projectors onto an associated transparent display at the host portal site in step 724.

In sum, examples of the present invention provide a realistic videoconferencing experience using a unique multi-view telepresence portal system. Moreover, several advantages are afforded by examples of the present invention. For instance, the portal system allows for video capture and rendering of multiple viewing angles and positions. Furthermore, the transparent displays enable realistic eye contact and accurate gaze awareness. As a result, applicability of examples of the present invention is useful for multiple virtual conferencing environments. For example, the telepresence portal system may be used for local or remote celebrity interviews during concerts and other stage shows, or for local or remote presentations for large meeting rooms or command and control centers. Moreover, in the case of video crosstalk in which the content displayed for viewing by the local participant is unintentionally captured by the local camera and delivered to the remote participant, any visual crosstalk reduction technique may be employed in the present system to ensure that the subject camera captures a clear view of the target scene without capturing the displayed content.

Furthermore, while the invention has been described with respect to exemplary embodiments, one skilled in the art will recognize that numerous modifications are possible. For example, although exemplary embodiments depict a single host participant and two remote participants, the invention is not limited thereto. For example, the host portal site may include two or more local users and the remote portal site may include one or more remote users, or any number of meeting participants that lie within the field of view of an optical sensor so as to enable accurate image capture. Furthermore, the transparent displays, image projectors, and image sensors at the host and remote portal site may be vary position and size than that depicted and described above so long as to preserve and enable the desired functionality of the telepresence portal system. Thus, although the invention has been described with respect to exemplary embodiments, it will be appreciated that the invention is intended to cover all modifications and equivalents within the scope of the following claims.

What is claimed is:

1. A telepresence portal system comprising:
   a host portal including a plurality of host transparent displays arranged to face different sides of a host user, wherein each host transparent display is associated with an image capturing device for capturing different viewpoint images of the host user;
   a remote portal in communication with the host portal and including at least one display configured to render the different viewpoint images of the host user.

2. The system of claim 1, wherein the remote portal includes a plurality of remote transparent displays arranged to correspond with the positions of the host transparent displays, wherein each remote transparent display renders a viewpoint image of the host user on the corresponding remote transparent display for view by at least one remote user.

3. The system of claim 1, wherein the remote portal further comprises:
   a plurality of remote image capture devices configured to capture views of remote users at the remote portal;
   a plurality of image projecting devices configured to project the views of the host users on corresponding the remote transparent displays at the remote portal.

4. The system of claim 3, wherein the host portal further comprises:
   a plurality of image projecting devices configured to render the views of the remote users on corresponding host transparent displays at the host portal.

5. The system of claim 1, wherein the plurality of host transparent displays are positioned adjacently so that the associated image capturing devices correspond to a front view of the host user and a side view of the host user.

6. The system of claim 1, wherein the plurality of host transparent displays are arranged in a parallel first position and second position such that the associated image capturing devices correspond to a front view and a rear view of the host user, and
   wherein the plurality of remote transparent displays at the remote portal are arranged in parallel positions corresponding to the positions of host transparent displays.

7. The system of claim 6, wherein when the host user is positioned proximate to the host transparent display in the first position, the front view of the host user is rendered on the remote transparent display in the corresponding first position, and
   wherein when the host user is positioned proximate to the host transparent display in the second position, the front view of the host user is rendered on the remote transparent display in the corresponding second position.

8. The system of claim 1, wherein the plurality of host transparent displays of the host portal and the plurality of remote transparent displays of the remote portal include dimensions capable of displaying a substantially life-sized image of the remote user and host user respectively.

9. A method for providing a multi-display telepresence portal system, the method comprising:
   capturing distinct viewpoint images of a host user at a host portal, wherein the host portal includes a plurality of host transparent displays associated with an image capturing device and arranged to face different sides of a host user;
   sending distinct viewpoint images of the host user from the host portal to a remote portal; and
   rendering the distinct viewpoint images of the host user on at least one display at the remote portal.

10. The method of claim 9, wherein the remote portal includes a plurality of remote transparent displays arranged to correspond with the positions of the host transparent displays such that the distinct viewpoint images of the host user are rendered on the corresponding remote transparent displays for view by at least one remote user.

11. The method of claim 9, further comprising:
capturing, via a plurality of image capturing devices at the remote portal, distinct viewpoint images of remote users;
projecting, via a plurality of image projecting devices at the remote portal, the distinct viewpoint images of the host user on the corresponding transparent displays for view by the at least one remote user; and
projecting, via a plurality of image projecting devices at the host portal, the distinct viewpoint images of the remote users on corresponding transparent displays for view by the host user.

12. The method of claim 9, wherein the plurality of host transparent displays are positioned adjacently so that the associated image capturing devices correspond to a front view of the host user and a side view of the host user.

13. The method of claim 9, wherein the plurality of host transparent displays are arranged in a parallel first position and second position such that the associated image capturing devices correspond to a front view and a rear view of the host user, and
wherein the plurality of remote transparent displays are arranged in parallel positions at the remote portal corresponding to the positions of the host transparent displays.

14. The method of claim 13, wherein when the host user is positioned proximate to the host transparent display in the first position, the front view of the host user is rendered on the remote transparent display in the corresponding first position, and
wherein when the host user is positioned proximate to the host transparent display in the second position, the front view of the host user is rendered on the remote transparent display in the corresponding second position.

15. A multi-display telepresence portal system comprising:
a host portal site including a plurality of host transparent displays, wherein each host transparent display is associated with an image capturing device for capturing different viewpoints of a host user and an image projecting device for projecting an image of a remote user on the transparent display;
a remote portal site in communication with the host portal site and including a plurality of remote transparent displays, wherein each remote transparent display is associated with an image capturing device for capturing different viewpoints of the remote user and an image projecting device for rendering a corresponding viewpoint of the host user on the associated display for view by at least one remote user.

* * * * *